(12) United States Patent
Jaeger et al.

(10) Patent No.: US 9,059,879 B2
(45) Date of Patent: Jun. 16, 2015

(54) TEST SIGNAL GENERATION AND APPLICATION IN RECEIVERS

(75) Inventors: Herbert Jaeger, Linz (AT); Christoph Wagner, Enns (AT)

(73) Assignee: Infineon Technologies AG, Neubiberg (DE)

( * ) Notice: Subject to any disclaimer, the term of this patent is extended or adjusted under 35 U.S.C. 154(b) by 745 days.

(21) Appl. No.: 13/178,882

(22) Filed: Jul. 8, 2011

(65) Prior Publication Data

US 2013/0010851 A1    Jan. 10, 2013

(51) Int. Cl.
| | | |
|---|---|---|
| *H03D 1/24* | (2006.01) | |
| *H04L 27/06* | (2006.01) | |
| *H04B 17/00* | (2015.01) | |
| *H04L 27/04* | (2006.01) | |
| *H04B 1/30* | (2006.01) | |
| *H04L 1/24* | (2006.01) | |

(52) U.S. Cl.
CPC .............. *H04L 27/06* (2013.01); *H04B 17/008* (2013.01); *H04L 27/04* (2013.01); *H04B 1/302* (2013.01); *H04L 1/244* (2013.01)

(58) Field of Classification Search
CPC ....... H04L 27/066; H04L 27/38; H04L 27/06; H04L 27/2647; H04L 1/20; H04L 1/24; H04N 55/4401
USPC ................... 375/321, 224, 320, 316
See application file for complete search history.

(56) References Cited

U.S. PATENT DOCUMENTS

| | | | | |
|---|---|---|---|---|
| 4,004,230 | A | * | 1/1977 | Campbell ................... 455/226.3 |
| 4,047,121 | A | * | 9/1977 | Campbell ........................ 331/76 |
| 4,809,203 | A | * | 2/1989 | Wilson et al. ..................... 708/3 |
| 6,107,956 | A | * | 8/2000 | Russell et al. .................. 342/70 |
| 6,400,233 | B1 | * | 6/2002 | Thomas ........................ 332/103 |
| 7,532,676 | B2 | * | 5/2009 | Fonseka et al. ............... 375/265 |
| 7,580,684 | B2 | | 8/2009 | Cyr et al. |
| 8,532,601 | B2 | * | 9/2013 | Tuttle et al. ................... 455/333 |
| 2003/0067357 | A1 | * | 4/2003 | Lin et al. ......................... 331/17 |
| 2004/0037353 | A1 | * | 2/2004 | Henriksson ................... 375/224 |
| 2006/0087323 | A1 | * | 4/2006 | Furse et al. .................... 324/519 |
| 2006/0211386 | A1 | * | 9/2006 | Thomas et al. ............... 455/104 |
| 2007/0189361 | A1 | * | 8/2007 | Sugiyama et al. ............ 375/132 |
| 2008/0026708 | A1 | * | 1/2008 | Marsili et al. ................. 455/118 |
| 2009/0009226 | A1 | * | 1/2009 | Mellor et al. ................. 327/255 |
| 2009/0079524 | A1 | * | 3/2009 | Cyr et al. ........................ 334/78 |
| 2010/0233981 | A1 | | 9/2010 | Kolmhofer et al. |
| 2011/0050339 | A1 | * | 3/2011 | Ohkawara et al. ............ 330/149 |
| 2011/0273197 | A1 | * | 11/2011 | Banerjee et al. ........... 324/750.3 |
| 2012/0033758 | A1 | * | 2/2012 | Cloutier et al. ............... 375/296 |

OTHER PUBLICATIONS

Agilent Technologies. "Digital Modulation in Communications Systems—An Introduction." 11 Pages.

* cited by examiner

*Primary Examiner* — Shuwang Liu
*Assistant Examiner* — Helene Tayong
(74) *Attorney, Agent, or Firm* — Eschweiler & Associates, LLC (57) ABSTRACT

One embodiment of the present invention relates to a test signal generator configured to generate a single sideband (SSB) test signal that is used for testing components of one or more receiver chains to identify errors in the receiver chains. In one embodiment, the circuit comprises a SSB signal generator configured to generate an IQ baseband signal comprising a sequence of constellation points corresponding to the SSB test signal. The constellation points are modulated onto a high frequency local oscillator signal to generate the SSB test signal, which is inserted into a reception path of a receiver at a test signal injection point. The reception path comprises a mixer configured to mix the SSB test signal with the local oscillator signal to generate a down-converted, intermediate frequency output signal. The output signal may be analyzed to determine errors in the reception path.

17 Claims, 6 Drawing Sheets

TEST SIGNAL GENERATION AND APPLICATION IN RECEIVERS

BACKGROUND OF THE INVENTION

Wireless communications are widely used in many modern day applications. For example, in motor vehicles wireless communication systems may be integrated with computer and sensor systems to form a wireless network that reduces the size of the wiring harness, thereby improving system cost, weight, reliability, serviceability, and installation time.

Typically, a wireless network sensor system may comprise a central processing unit (e.g., an on-board computer of the vehicle) that is configured to wirelessly receive a signal, (e.g., a voltage or digital value) which corresponds to a physical change in a measurable quantity, using one or more receivers. Such networks are often employed for safety-critical functions in state-of-the-art transportation systems, since a computer can react to possible dangerous situations with a speed and dependability that is unmatched by human capabilities.

For example, automotive radar devices may utilize a plurality of receivers. In one specific example, automotive radar devices may be used to generate a digital beamforming radar employed in advanced cruise control systems that can actuate a motor vehicle's accelerator and/or brakes to control its distance separation behind another vehicle. In such safety critical wireless network applications, it is important to ensure the proper operation of the receivers.

BRIEF DESCRIPTION OF THE DRAWINGS

FIG. 4b illustrates a timing diagram corresponding to the single sideband signal generator of FIG. 4a.

DETAILED DESCRIPTION OF THE INVENTION

The present invention will now be described with reference to the attached drawing figures, wherein like reference numerals are used to refer to like elements throughout, and wherein the illustrated structures and devices are not necessarily drawn to scale.

It will be appreciated that, a frequency sideband is a band of frequencies higher than or lower than a carrier frequency and containing power as a result of a modulation process. As provided herein, the term "single sideband signal" may broadly refer to signals that have a dominant single frequency sideband (e.g., signals having either a higher or a lower frequency sideband that is substantially larger than other sidebands). This is in contrast to a "double sideband signal", which refers to signals having more than one frequency sideband (e.g., signals having symmetric upper and lower frequency sidebands).

Some aspects of the present disclosure provide for a receiver circuit having a test signal generator configured to generate a single sideband (SSB) test signal that is used for testing components of one or more reception paths (i.e., receiver chains) to identify errors in the reception paths (e.g., a malfunctioning mixer of a receiver chain). In one embodiment, the circuit comprises a SSB signal generator configured to generate an IQ baseband signal comprising a sequence of constellation points corresponding to a single side band (SSB) test signal. The constellation points are modulated onto a high frequency local oscillator signal to generate a SSB test signal that is inserted into a reception path of a receiver at a test signal injection point. The reception path comprises a mixer configured to mix the SSB test signal with the local oscillator signal to generate a down-converted, intermediate frequency output signal. The output signal may be analyzed to determine errors in the reception path (e.g., in the mixer). Therefore, the circuit generates a simple SSB test signal that offers robust testing of the one or more reception paths.

Figure 1:
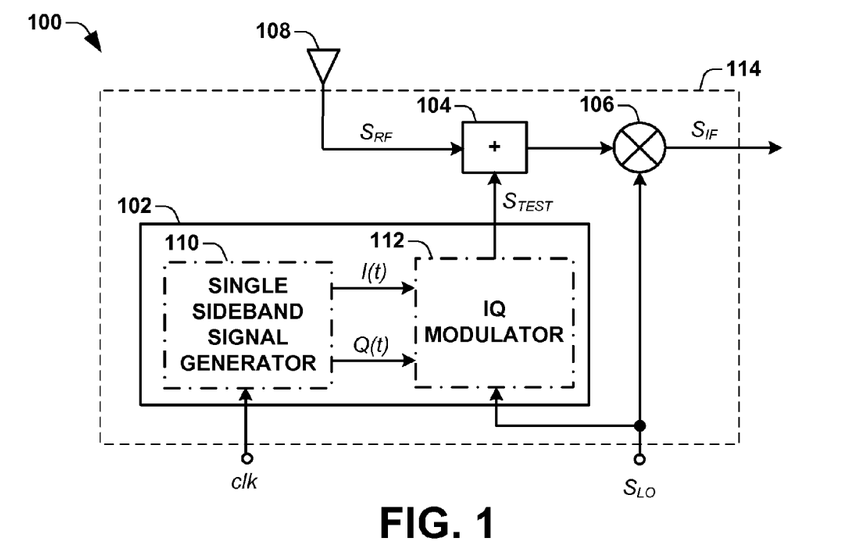
FIG. 1 illustrates a block diagram of a first embodiment of a receiver chain testing circuit.

Referring to FIG. 1, a block diagram of a first embodiment of a receiver circuit 100 is illustrated. The receiver circuit 100 comprises a test signal generation component 102 configured to generate a high frequency SSB test signal $S_{TEST}$ comprising a single sideband (SSB) signal. The SSB test signal $S_{TEST}$ is provided to a reception path (i.e., receiver chain), which is coupled to an antenna 108 that is configured to receive an RF signal. The reception path comprises a test signal injection point 104 and a mixer 106. The test signal injection point 104 is configured to inject the SSB test signal $S_{TEST}$ into the reception path. To ensure that coupling of the test signal $S_{TEST}$ to the reception path is done in a manner that influences the reception path as little as possible (i.e., that attenuates the receiver signal $S_{RF}$ as little as possible), the test signal injection point 104 may comprise a high impedance resistive or capacitive coupling means. A mixer 116 is configured to down-convert the SSB test signal $S_{TEST}$ to an intermediate frequency (IF) output signal that can be analyzed for its amplitude and phase to evaluate the reception path's operation (e.g., to detect an error in a receiver chain component).

In one embodiment, the test signal generation component 102 may operate according to an I/O modulation scheme to generate a SSB test signal. In one embodiment, the test signal generation component 102 may comprise a single sideband (SSB) signal generator 110 configured to generate an IQ baseband signal comprising I and Q components based upon a sequence of constellation points having specifically determined I/O data that corresponds to a SSB signal (i.e., having I and Q signals that cancel one or more unwanted sidebands during modulation, to generate a single dominant sideband). The IQ baseband signal is provided from the SSB signal generator 110 to an IQ modulator 112 that is configured to modulate the IQ signal onto a local oscillator carrier signal $S_{LO}$. Unlike more complex testing systems, the SSB test signal $S_{TEST}$ is generated using an IQ baseband signal having a simple sequence of constellation points that are independent of the received RF signal (e.g., the SSB test signal is not generated to model the RF signal received at antenna 108). Furthermore, the single sideband test signal makes entire receiver circuit independent of phase difference between test signal and a local oscillator and/or receiver signal phase, thereby providing a robust test signal.

In one embodiment, the test signal generation component 102 and reception path may be fully integrated onto a single integrated chip 114 (e.g., integrated into a semiconductor body in CMOS technology). This allows for the testing to be performed during production, as well as in a deployed, operating product.

Figure 2:
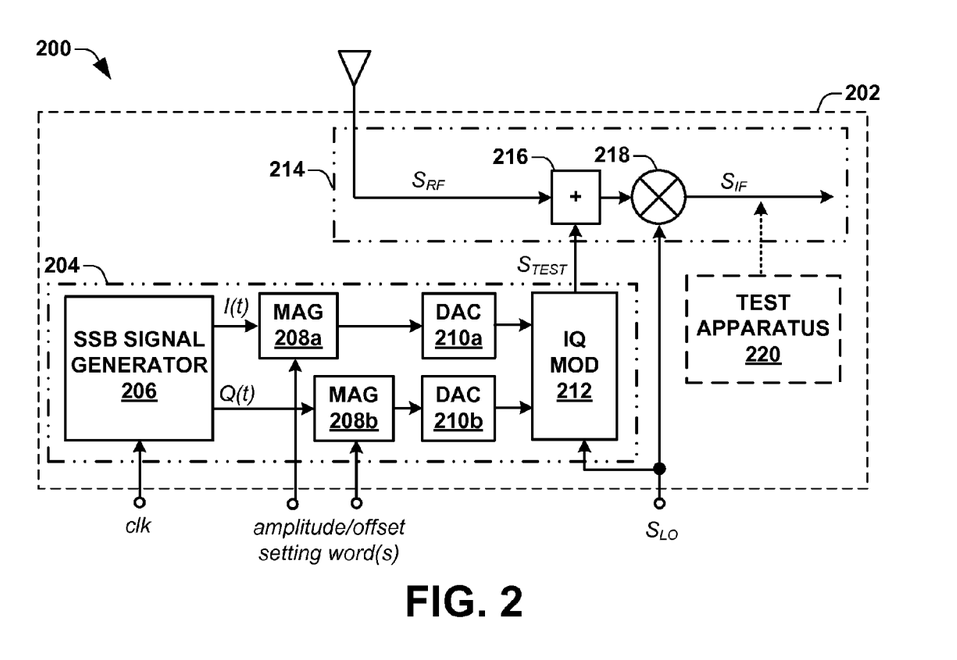
FIG. 2 illustrates a block diagram of a more detailed embodiment of a receiver chain testing circuit.

FIG. 2 illustrates a more detailed embodiment of a receiver circuit 200. The receiver circuit 200 comprises a test signal generation component 204 having a SSB signal generator 206 with a digital clock input configured to receive a digital clock signal clk. The SSB signal generator 206 is configured to generate an IQ baseband signal comprising a sequence of "constellation points" that are traversed in a particular sequence as timed by the digital lock signal clk. In other words, the SSB signal generator 206 selectively generates a sequence of in-phase (I(t)) and quadrature phase (Q(t)) signal components, which are provided to an in-phase signal path and a quadrature phase signal path. In one embodiment, wherein the digital clock signal clk may comprise a low frequency digital clock signal (e.g., a clock signal having a lower frequency than the received RF signal), the SSB signal generator 206 is configured to generate the IQ baseband signal from the low frequency digital clock signal.

Digital signal magnitude setting blocks 208a and 208b may be coupled to the output of the SSB signal generator 206 within the in-phase signal path and the quadrature phase signal path, respectively. The digital signal magnitude setting blocks 208a and 208b are configured to control the amplitude of the I and Q components of the IQ baseband signal according to one or more digital signals (e.g., digital amplitude or digital offset setting words). In various embodiments, different or a same amplitude setting or digital offset words may be provided to the digital signal magnitude setting blocks 208a and 208b. In one embodiment, the one or more digital signals may be provided to the digital signal magnitude setting blocks 208a and 208b from a source external to the chip 202.

In one embodiment, the digital signal magnitude setting blocks 208a and 208b may comprise multipliers configured to multiple the amplitude of the I and Q signal components by a multiplication factor set by an amplitude setting word(s). For example, multipliers may be configured to multiple a digital amplitude setting word with I and Q signal component (e.g., providing for a simple implementation of multiplication in the digital domain when I/O signals are one bit wide). In another embodiment, the digital signal magnitude setting blocks may additionally or alternatively comprise adders/subtractors configured to add or subtract an offset value to/from the amplitude of the I and Q signal components based upon a offset setting word(s).

Digital-to-analog converters (DACs) 210a and 210b are located downstream of the digital signal magnitude setting blocks 208a and 208b. As shown in FIG. 2, DACs 210a and 210b are respectively coupled to the output of digital signal magnitude setting blocks 208a and 208b. DACs 210a and 210b are configured to convert received I and Q signal components from digital signals to analog signals.

An IQ modulator 212 is configured to receive the analog baseband IQ signals and to modulate the baseband IQ signal onto a local oscillator (LO) signals $S_{LO}$ (e.g., separated by a 90° phase shift between I and Q components) to generate a high frequency SSB test signal $S_{TEST}$. During modulation, the specific I and Q components of the baseband signal automatically cancel out an unwanted sideband, to generate a high frequency, SSB test signal $S_{TEST}$. The high frequency SSB test signal $S_{TEST}$ is injected into the reception path 214 at a test signal insertion point 216. In one embodiment, the test signal insertion point 216 may comprise a coupler, such as a directional coupler, for example. In alternative embodiments, the test signal insertion point 216 may comprise a weak capacitive coupler, a switch, or some other equivalent coupling device. It will be appreciated that the test signal insertion point 216 will perform coupling of the test signal $S_{TEST}$ to the reception path 214 in a manner that influences the reception path as little as possible, so that the overall receiver performance (e.g., receiver sensitivity) is not degraded.

The output of the test signal insertion point 216 is provided to a mixer 218 configured to receive the SSB test signal $S_{TEST}$ and the local oscillator signal $S_{LO}$. The mixer 218 down-converts the SSB test signal $S_{TEST}$ by mixing the SSB test signal with the local oscillator signal $S_{LO}$, resulting in a down converted, intermediate frequency (IF) output signal $S_{IF}$ that may be analyzed to perform testing of the reception path (e.g., the mixer 218). The information received from the analysis can be used to get information about the receiver's performance, or determine if an error is present in the device under test (mixer 216). In one embodiment, a test apparatus 220 may be configured to analyze the magnitude and/or phase of the IF output signal $S_{IF}$. In one embodiment, the test apparatus 220 may be located on chip 202. In an alternative embodiment, the test apparatus 220 may be off chip 202.

A test signal generation component, provided herein, may be configured to perform a test of a reception path at the time of manufacture of the chip and during operation in the field. For example, when in the field, a receiver may be operated in a test mode or in a normal reception mode. In the test mode, the test signal generation component is configured to inject a SSB test signal into the reception path, while in the normal reception mode, the test signal generation component is turned "off" so that the a test signal is not injected into the reception path (e.g., as shown in FIG. 2, the digital amplitude setting word may be used to "deactivate" the test signal generation component 204 when it is not in by the receiver, by setting the amplitude of the IQ baseband signal to zero). In one embodiment, the reception path may remain coupled to an antenna, while test signal generation component tests the reception path (e.g., mixer) on a continuous basis between received signals (e.g., between bursts of received signal in a radar system).

Figure 3A:
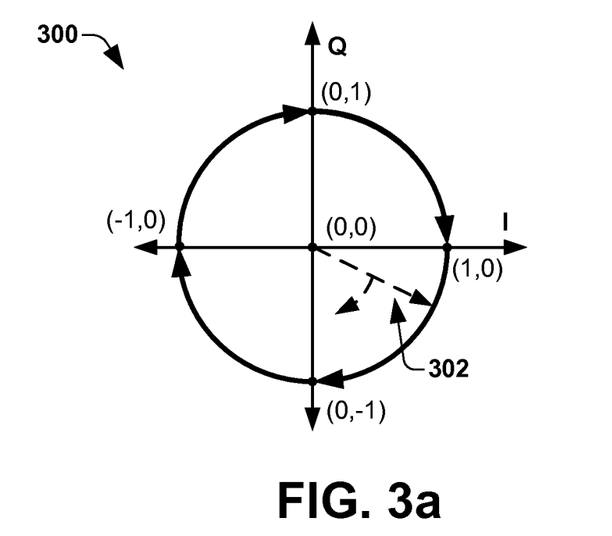
FIG. 3a illustrates a polar diagram showing IQ data that may be used to generate a single sideband test signal having a positive frequency single sideband.
Figure 3B:
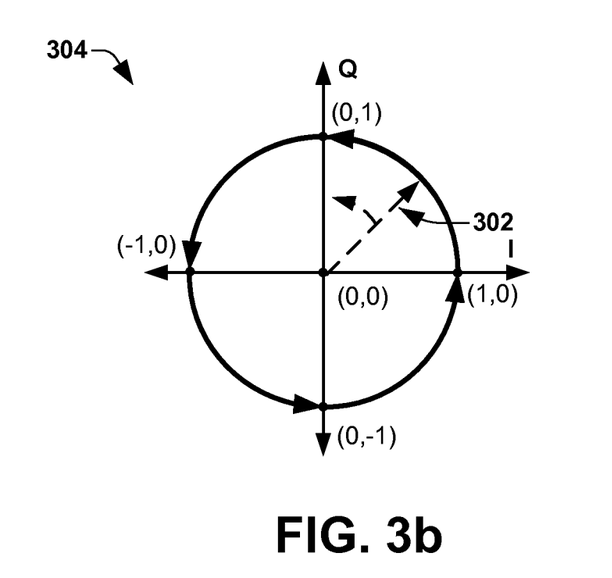
FIG. 3b illustrates a polar diagram showing IQ data that may be used to generate a single sideband test signal having a negative frequency single sideband.

The SSB signal generator provided herein (e.g., corresponding to SSB signal generator 206) is configured to generate an IQ baseband signal having a plurality of selectively chosen constellation points. When traversed in a particular sequence by an IQ modulator, the constellation points cause the IQ modulator to substantially suppress/cancel out any unwanted sideband(s), inherently resulting in a SSB test signal. FIGS. 3a-3b illustrate polar diagrams illustrating two exemplary constellation point sequences that may be used to generate a SSB test signal having a single frequency sideband. The polar diagrams comprise an I-axis, located on the zero degree phase reference and a Q-axis that is rotated by 90° with respect to the I axis.

FIG. 3a illustrates a first embodiment of a sequence of constellation points as provided herein. As illustrated in the polar diagram 300 of FIG. 3a, if the I (cosine) and Q (sine) signal components are simultaneously modulated onto a local oscillator carrier signal, the modulated carrier vector 302 will rotate clockwise if Q leads I. Clockwise rotation means that the modulated test signal has a single sideband at a higher frequency than the un-modulated local oscillator carrier signal (i.e., spectral components above the local oscillator frequency). Therefore, in one embodiment, the SSB signal generator may be configured to generate a sequence of four constellation points (I;Q=[1;0], [0;−1], [−1;0], [0;1]) arranged in a clockwise configuration around the origin and timed by the clock signal. In such an embodiment, the sequence of constellation points (I;Q=[1;0], [0;−1], [−1;0], [0;1]) span 360° in the I/Q plane, such that every four clock cycles the signal will return to the same location on the I/Q plane.

FIG. 3b illustrates an alternative embodiment of a constellation point sequence as provided herein. As illustrated in the polar diagram 304 of FIG. 3b, if the I (cosine) and Q (sine) signal components are simultaneously modulated onto the local oscillator carrier signal, the modulated carrier vector 302 will rotate counterclockwise if I leads Q. Counterclockwise rotation means that the modulated test signal has a sideband at a lower frequency than the un-modulated local oscillator carrier signal (i.e., spectral components below the local oscillator frequency). Therefore, in one embodiment, the SSB signal generator may be configured to generate a sequence of four constellation points (I;Q=[1;0], [0;1], [−1;0], [0;−1]) arranged in a counter clockwise configuration around the origin (i.e., comprising the constellation points shown in FIG. 3a traversed in the opposite (CCW) direction) and timed by the clock signal. In such an embodiment, the sequence of constellation points (I;Q=[1;0], [0;1], [−1;0], [0;−1]) span 360° in the I/O plane, such that every four clock cycles the signal will return to the same location on the I/O plane.

Therefore, the constellation point sequences illustrated in FIGS. 3a-3b can be traversed in either a clockwise direction that would generate a positive frequency single sideband of a local carrier signal or a counter clockwise direction that would generate a negative frequency single sideband of a local oscillator carrier signal. Furthermore, the generation of a SSB test signal using an IQ modulator can provide for a SSB test signal at high frequencies. For example, at local oscillator carrier signal frequencies around 77 GHz, wherein generation of a single sideband using filters is unfeasible, a SSB test signal may be generated using IQ modulation.

Although FIGS. 3a-3b illustrate a relatively simple constellation point sequence, having four constellation points, one of ordinary skill in the art will appreciate that this is one non-limiting example and that other more complex test signals may be realized. In various embodiments, test signals may comprise more constellation points to improve the quality of the sidebands reduce harmonics. For example, in one embodiment, a constellation point sequence may comprise 8 constellation points located upon a unit circuit centered around the origin.

Figure 4A:
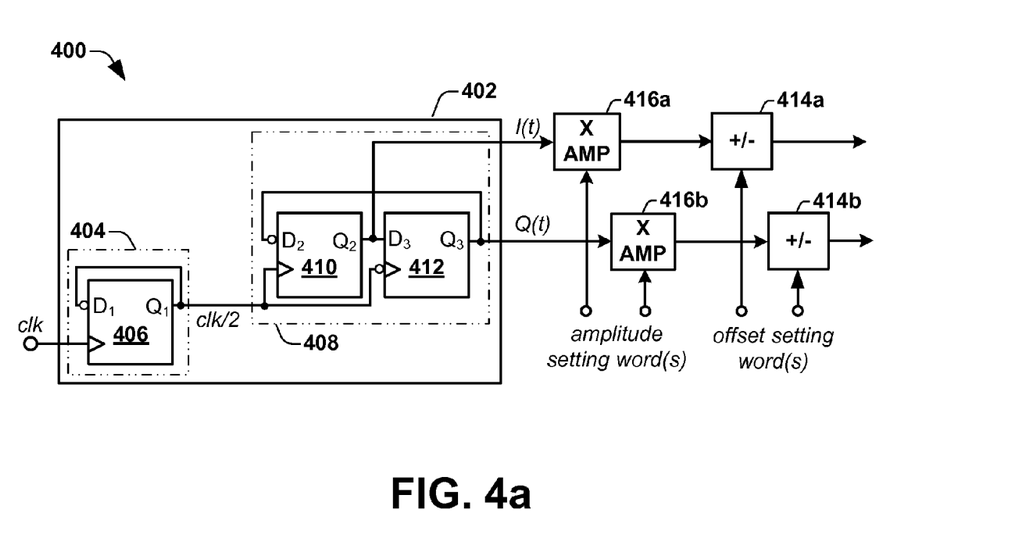
FIG. 4a illustrates a block diagram of a more detailed embodiment of a single sideband signal generator.

FIG. 4a illustrates a SSB signal generator 402 configured to generate an IQ baseband signal comprising a sequence of constellation points (I;Q=[0;0], [0;1], [1;1], [1;0]). The SSB signal generator of FIG. 4a comprises one or more frequency dividers configured to generate the sequence of constellation points based upon a digital clock signal. As illustrated in FIG. 4a, because the SSB test signal is generated independent of the received signal (i.e., the test signal is not generated to model the received signal), the SSB signal generator may comprise a relatively simple structure having low complexity and small size.

Figure 4B:
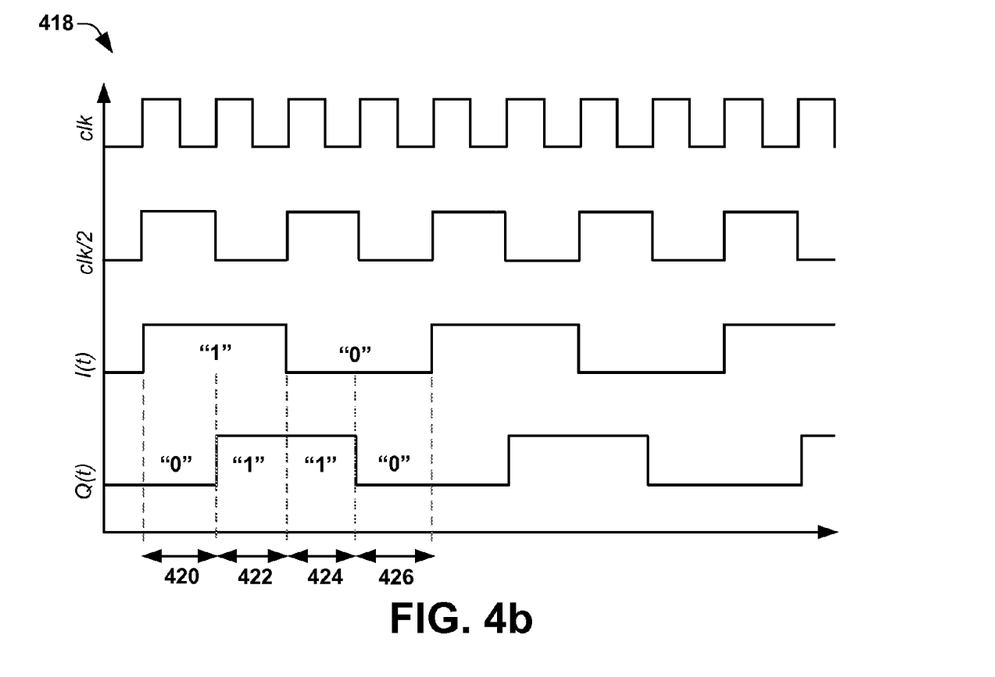

Referring to FIG. 4a, the SSB signal generator 402 comprises a divide-by-two frequency divider 404 and a constellation point logic generator 408. Since the SSB signal generator is configured to operate on both rising and falling clock edges, the divide-by-two frequency divider 404 is configured to perform a 'duty cycle correction' that provides for equal spacing of both rising and falling clock edges. As illustrated in FIG. 4a, the divide-by-two frequency divider 404 is configured to receive a digital clock signal clk and to generate a divided-by-two clock signal clk/2 therefrom. FIG. 4b illustrates a timing diagram 418 of digital clock signals clk and clk/2. In one embodiment, the divide-by-two frequency divider 404 may comprise a D flip-flop 406 clocked by the digital clock signal clk and having an output $Q_1$ that is provided as a delayed input $D_1$ (having an opposite value as the output at $Q_1$) by way of a feedback path. As illustrated in FIG. 4b, the $Q_1$ output takes on the state of the $D_1$ input at the moment of a falling edge at the input clock signal, resulting in a clock signal clk/2 having ½ the frequency of the input clock signal clk.

The constellation point logic generator 408 is configured to generate the sequence of constellation points (I;Q=[1;0], [1;1], [0;1], [0;0]) at the rising and falling edges of the divided-by-two clock signal clk/2. In one embodiment, the constellation point logic generator 408 may comprise a divide-by-four Johnson counter having two D flip-flops, flip-flop 410 clocked by the divided-by-two clock signal clk/2 and flip flop 412 clocked by an inverted divided-by-two clock signal clk/2. The output $Q_2$ of flip-flop 410 has a frequency ½ the frequency of the divided-by-two clock signal clk/2 and is provided as an in-phase (I(t)) signal and is further provided to as an input flip-flop 412 (at $D_3$). The output $Q_3$ of the flip-flop 412 has a frequency ¼ the frequency of the divided-by-two clock signal clk/2 and is provided as a quadrature (Q(t)) phase signal and as an input into flip-flop 410 (at $D_2$).

FIG. 4b illustrates a timing diagram 418 of the IQ baseband signals I(t) and Q(t) during a plurality of clock periods 420-426. As shown in FIG. 4b, the IQ baseband signal provides a first constellation point $I_1,Q_1$=(1,0), during a first clock period 420. The first constellation point may be modulated onto a local oscillator signal to generate a SSB test signal that is subsequently down-converted for testing. If the down-converted test signal results in I and Q information that corresponds to constellation point $I_1,Q_1$, the receiver is operating correctly (e.g., the output signal may be shifted due to unknown phase in receiver signal). However, if the down-converted test signal results in I and Q information that does not correspond to the constellation point $I_1,Q_1$, the receiver is not operating correctly.

Referring to FIG. 4a, adders 414a and 414b may be configured downstream of the SSB signal generator 402. The adders 414a and 414b are configured to introduce a DC offset into the I and Q signals based upon one or more offset setting word(s), thereby shifting the signals by an amount that centers the signals around the origin of an I/O plane. For example, adders 414a and 414b may be configured to add or subtract half the amplitude setting (0.5) to/from the average (zero) value, depending on the I (in-phase) and Q (quadrature) component of the test signal, to center the sequence of constellation points around the origin. In one embodiment, the adders 414a and 414b may be coupled (e.g., upstream of downstream) to multipliers, 416a and 416b, which are configured to adjust the amplitude of the I and Q signals by multiplying the I and Q signals by a multiplication factor (e.g., provided by an amplitude adjustment word).

Figure 5A:
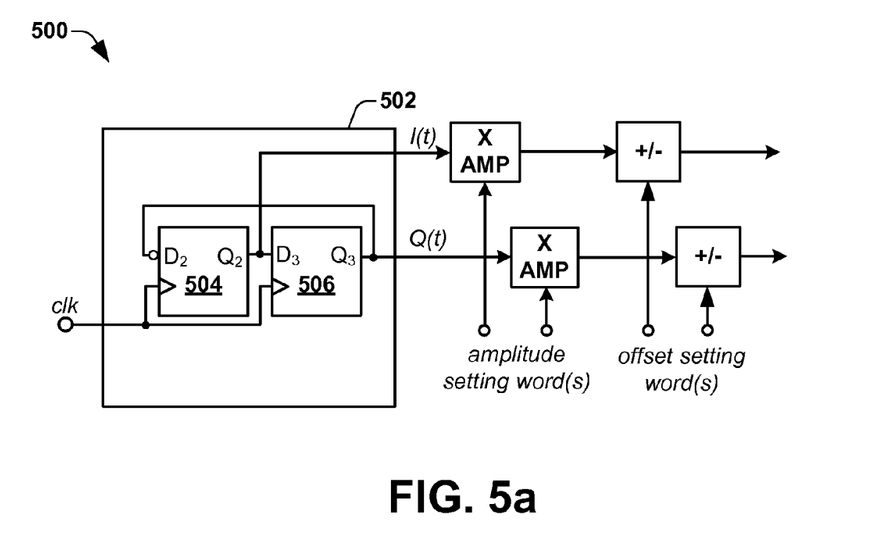
FIGS. 5a-5b illustrate an alternative embodiment of a single sideband signal generator and associated timing diagrams.

FIG. 5a illustrates a block diagram of an alternative embodiment of a single sideband signal generator 500 comprising one or more frequency dividers configured to generate the sequence of constellation points based upon a digital clock signal. The SSB signal generator 500 is configured to generate an IQ baseband signal comprising a sequence of constellation points (I;Q=[1;0], [1;1], [0;1], [0;0]). It will be appreciated that the SSB generators illustrated in FIGS. 4a and 5a are non-limiting examples of SSB generators. The inventors have conceived of alternatives of these examples as falling within the inventive concept provided herein.

Referring to FIG. 5a, a clk signal is provided to a constellation point logic generator 502 comprising a divide-by-four Johnson counter. The constellation point logic generator 502 has two D flip-flops, 504 and 506, clocked by the clock signal clk. The output $Q_2$ of flip-flop 504 has a frequency ½ the frequency of the clock signal clk and is provided as an in-phase (I(t)) signal and is further provided to as an input flip-flop 506 (at $D_3$). The output $Q_3$ of the flip-flop 506 has a frequency ¼ the frequency of the clock signal clk and is provided as a quadrature (Q(t)) phase signal and as an input into flip-flop 504 (at $D_2$).

Figure 5B:
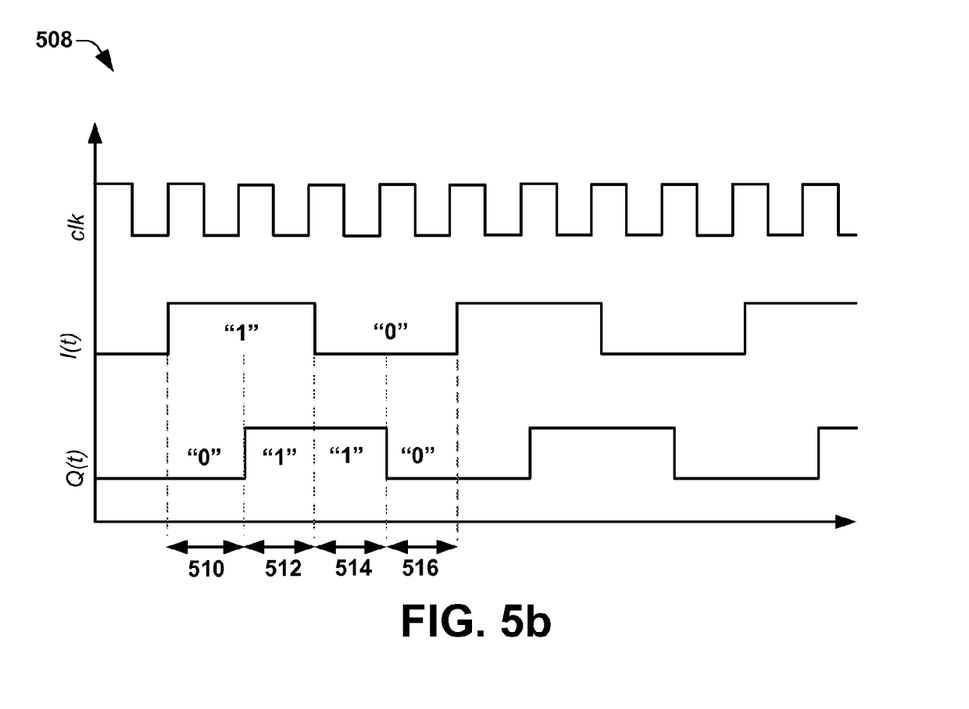

FIG. 5b illustrates a timing diagram 508 of the IQ baseband signals I(t) and Q(t) during a plurality of clock periods 510-516. As shown in FIG. 5b, the constellation point logic generator 502 works on a single clock edge (e.g., thereby making the divide-by-two divider of FIG. 4a not necessary). As shown in FIG. 5b, the IQ baseband signal provides a first constellation point $I_1, Q_1=(1;0)$, during a first clock period 510, a second constellation point $I_2, Q_2=(1;1)$, during a second clock period 512, a third constellation point $I_3, Q_3=(0;1)$, during a third clock period 514, and a fourth constellation point $I_4, Q_4=(0;0)$, during a fourth clock period 516.

Figure 6:
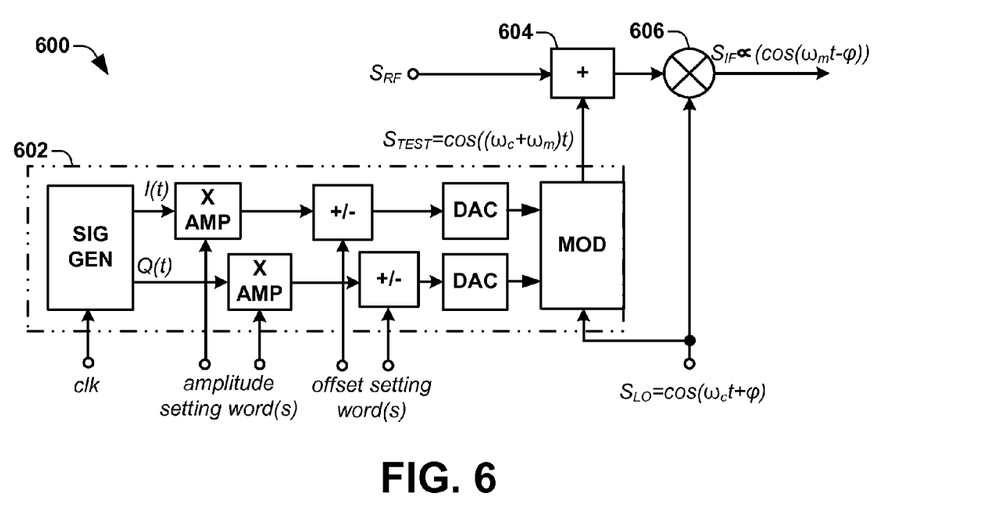
FIG. 6 illustrates a block diagram of a receiver chain testing circuit, particularly illustrating generic signal functions associated with the circuit.

FIG. 6 illustrates a block diagram of a receiver circuit 600 illustrating the functional form of signals within the receiver circuit. The illustrated signal functions illustrate how the single sideband property of the test signal optimizes performance (i.e. monitoring of receiver functionality) for possible local oscillator phases.

As illustrated in FIG. 6, the test signal generation circuit 602 is configured to generate a single sideband (SSB) test signal having the form of $S_{TEST}=\cos((\omega_c+\omega_m)t)$, where $\omega_c$ is the angular frequency of the local oscillator carrier signal and $\omega_m$ is the angular frequency generated by modulation. The single sideband (SSB) test signal can be generated by using an IQ modulator and appropriate modulation signals, as described above.

The mixer 604 is configured to multiply the SSB test signal with a sinusoidal local oscillator signal $S_{LO}=\cos(\omega_c t+\phi)$, which is the same as the carrier signal for the test signal modulator shifted by any arbitrary phase $\phi$ relative to the modulated local oscillator carrier signal. The down-converted SSB test signal output from mixer 604 is proportional to $\cos(\omega_m t-\phi)$.

The phase $\phi$ is difficult to control in complex designs (e.g., especially at mm-wave frequencies) due to the impact of such variables as transmission line length, matching condition, and (temperature dependent) behavior of amplifier/buffer stages. The use of a SSB test signal eliminates these drawbacks by generating a mixer output signal (proportional to $\cos(\omega_m t-\phi)$) having an amplitude that is independent of $\phi$. This is in contrast to a double sideband (DSB) test signal (having a form proportional to $\cos(\omega_m t)\cos(\phi)$), which due to an amplitude dependence on $\phi$ may return erroneous results (e.g., if a 90° phase difference $\phi$ is present between a local oscillator signal and a test signal then a resultant output signal will have a zero magnitude, so that an error can't be detected since test signal disappears even if device under test is working). Therefore, because of its phase invariance, the SSB test signal works equally well with any phase difference between a test signal and a local oscillator signal.

Figure 7:
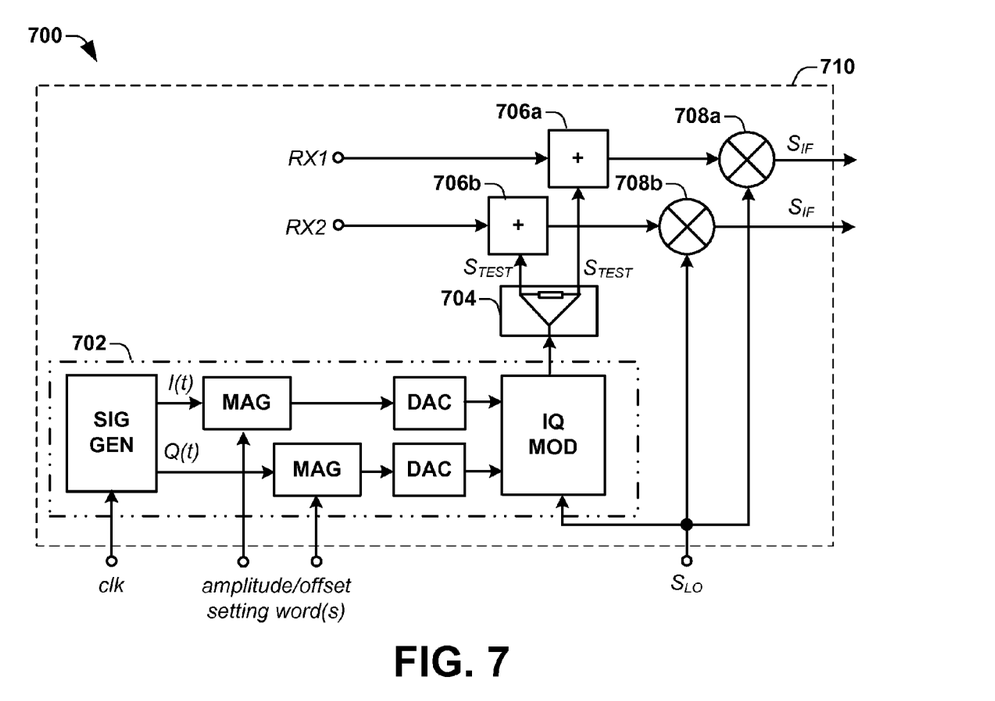
FIG. 7 illustrates a block diagram of an additional embodiment of a receiver circuit configured to provide a SSB test signal to a plurality of reception paths.

In various embodiments, a receiver circuit may comprise more than one reception path (i.e., receiver chain). For example, automotive radar devices (e.g., employed in advanced cruise control systems) may utilize a digital beamforming (DBF) radar having a spatially diverse receiver antenna array configured to detect objects external to an automobile. FIG. 7 illustrates a receiver circuit 700 having two reception paths RX1 and RX2. It will be appreciated that although FIG. 7 illustrates a receiver circuit 700 having two reception paths, that the invention provided herein may be applied to a receiver circuit having any number of reception paths (e.g., 3, 4, 5, etc. reception paths).

In one embodiment, the test signal generator 602 is configured to provide a SSB test signal $S_{TEST}$ to a distribution network comprising a symmetric power splitter 704 (e.g., such as a Wilkinson divider). The symmetric power splitter 704 is configured to supply the SSB test signal $S_{TEST}$ to test signal insertion points (e.g., couplers), 706a and 706b, located within multiple reception paths RX1 and RX2 on the same chip 710. To ensure that the SSB test signal $S_{TEST}$ is distributed equally to the test signal insertion points, 706a and 706b, the symmetric power splitter 704 may be configured to have equal transmission line lengths for each reception path RX1 and RX2.

In one embodiment, the relative phase drift of the different receivers RX1 and RX2 may be monitored against one another by having a symmetric chip layout with respect to the signal distribution 704 and coupling elements 606 (e.g., by having equal transmission line lengths for each reception path RX1 and RX2). For example, symmetric power splitter may be used to ensure substantially equal phase of the injected test signal into all receiver paths so that a comparison between the down-converted test signals of each receiver path can be made. Such a comparison may be used to generate phase information (e.g., to monitor relative phase drift of the reception paths against each other). In one embodiment, such information can be used for calibration of digital beamforming (DBF) receive signal processing.

Mixers 708a and 708b are configured to receive the SSB test signal $S_{TEST}$ and to down-convert it using the local oscillator signal $S_{LO}$. The resultant intermediate frequency (IF) output signals, $S_{IF1}$ and $S_{IF2}$, may be analyzed to retrieve the information about the IF output signals, $S_{IF1}$ and $S_{IF2}$, produced by the individual receivers. The information received from the analysis can be used to get information about the receiver's performance, or determine if an error is present in the devices under test (i.e., mixers 608a and 608b).

Figure 8:
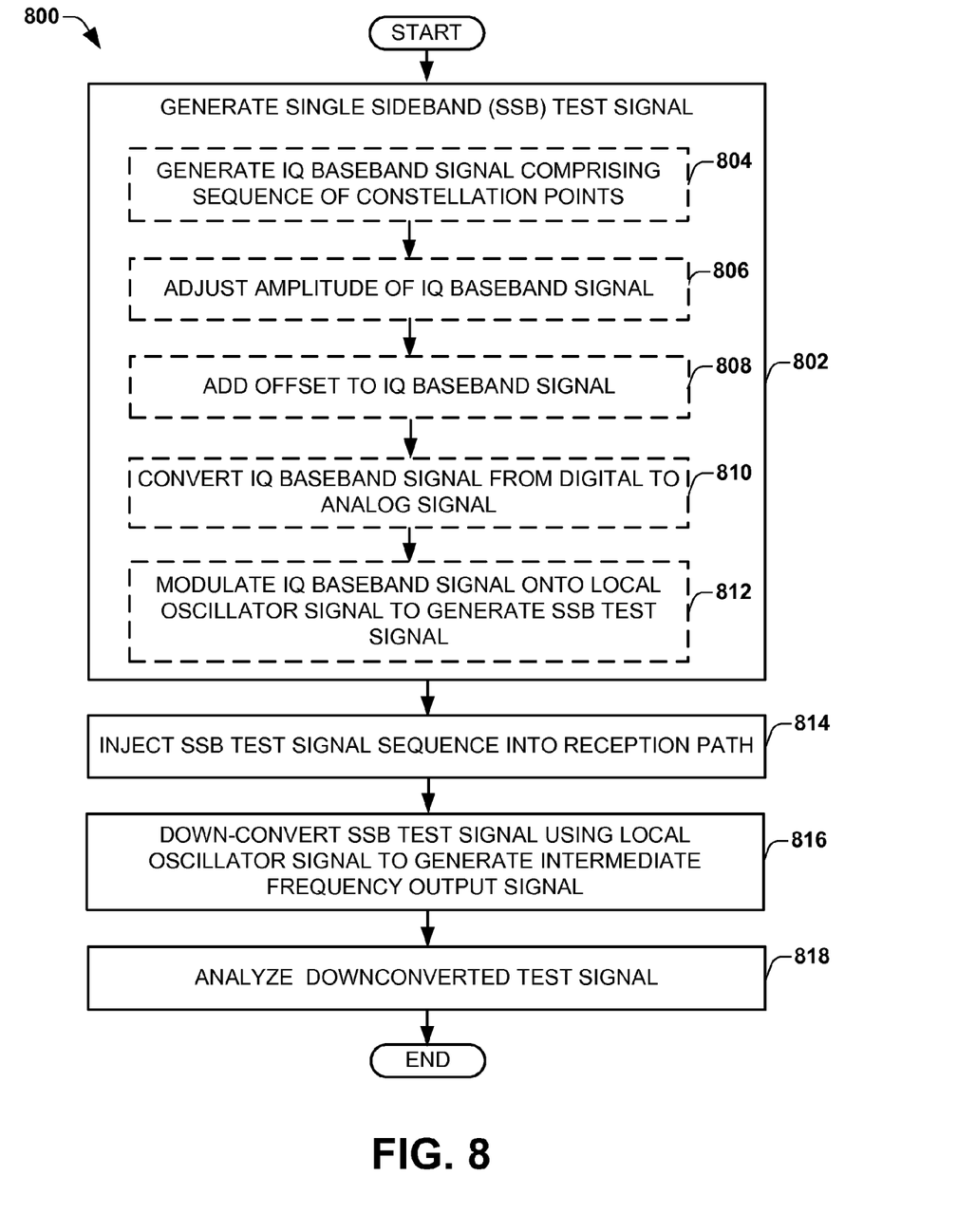
FIG. 8 illustrates a flow diagram of a method for testing one or more reception paths.

FIG. 8 illustrates a flow diagram 800 of a method for testing one or more reception paths of a receiver circuit. While the methods provided herein are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

Furthermore, the claimed subject matter may be implemented as a method, apparatus, or article of manufacture using standard programming and/or engineering techniques to produce software, firmware, hardware, or any combination thereof to control a computer to implement the disclosed subject matter (e.g., the circuits shown in FIG. 1, 2, etc., are non-limiting examples of circuits that may be used to implement method 800). The term "article of manufacture" as used herein is intended to encompass a computer program accessible from any computer-readable device, carrier, or media.

Of course, those skilled in the art will recognize many modifications may be made to this configuration without departing from the scope or spirit of the claimed subject matter.

At 802 a single sideband (SSB) test signal is generated. The SSB test signal is generated independent of a signal (e.g., RF signal) received in the reception path(s) of the receiver circuit (i.e., the SSB test signal is not generated to model the received signal), therefore allowing the SSB test signal to comprise a relatively simple test signal that may be generated using simple logic elements.

In one embodiment, generation of SSB test signal may comprise generation of an IQ baseband signal comprising a specific sequence of I and Q constellation points based upon the division of a digital clock signal by one or more frequency dividers (804). The amplitude of IQ baseband signal may be adjusted (e.g., increased, decreased) based upon an amplitude setting word (806). Alternatively or additionally an offset may be added to the IQ baseband signal (808). The IQ baseband signal may then be converted from a digital signal to an analog signal (810), before an IQ modulator modulates the baseband IQ signal onto local oscillator (LO) signal to generate a high frequency, single sideband test signal (812).

The SSB test signal is injected into one or more reception paths at 814. Injection of the SSB test signal into the one or more reception paths is performed in a manner that minimally influences the one or more reception paths, so that the overall receiver performance is not degraded. In one embodiment, a coupler may be configured to inject the SSB test signal into the one or more reception paths.

The SSB test signal is down-converted to generate an intermediate frequency output signal at 816. Down-conversion of the SSB test signal may be performed using the local oscillator signal, such that the local oscillator signal for the receiver is the same as the carrier signal for the test signal modulator.

At 818 the down-converted test signal is analyzed. The analyzed test signal may be used to test the reception path to identify errors in one or more components (e.g., mixers) of the reception path.

Although the invention has been illustrated and described with respect to one or more implementations, alterations and/or modifications may be made to the illustrated examples without departing from the spirit and scope of the appended claims. For example, although some figures do not illustrate adders/subtracts to enable an offset setting capability (e.g., corresponding to adder/subtractor 414), such components may be included in any of the block diagrams of this disclosure.

Furthermore, although the invention is described herein in relation to a receiver circuit (e.g., as illustrated in FIGS. 1, 2, etc.), it will be appreciated that this is a non-limiting embodiment of the invention, which may also be applied to transceivers, wherein a transmitter and a receiver are combined and operate through one antenna. In such an embodiment, a circuit may comprise a transmitter, a receiver, and a circuit (e.g. a directional coupler, duplex filter, switch, etc.) that combines the transmitter and receiver RF ports to an antenna port. Testing of the receiver portion of the circuit may be performed as described in this invention.

Moreover, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A receiver circuit, comprising:
    a test signal generation component configured to generate a single side band (SSB) test signal independent from a signal received by a reception path of the receiver circuit, wherein the test signal generation component comprises:
        a SSB signal generator configured to generate an IQ baseband signal having an in-phase signal component and a quadrature phase signal component;
        first and second magnitude setting blocks located downstream of the SSB signal generator and respectively configured to selectively vary a magnitude of the in-phase signal component based upon a first amplitude setting word and to vary a magnitude of the quadrature phase signal component based upon a second amplitude setting word; and
        an IQ modulator configured to receive the IQ baseband signal and to generate the SSB test signal by modulating the IQ baseband signal onto a local oscillator signal,
    a test signal injection point configured to provide the SSB test signal to the reception path of the receiver circuit; and
    a mixer located within the reception path at a location downstream of the test signal injection point, the mixer configured to mix the SSB test signal with the local oscillator signal to generate a down-converted output signal indicative of an error in the reception path.

2. The receiver circuit of claim 1, wherein the IQ baseband signal comprises a sequence of constellation points.

3. The receiver circuit of claim 2, further comprising:
    a first adder located downstream of the SSB signal generator and configured to add or subtract an offset value to the in-phase signal component; and
    a second adder located downstream of the SSB signal generator and configured to add or subtract an offset value to the quadrature phase signal component.

4. The receiver circuit of claim 2, wherein the SSB signal generator is configured to receive a low frequency digital clock signal at a digital clock input and to generate the IQ baseband signal therefrom.

5. The receiver circuit of claim 4, wherein the SSB signal generator comprises one or more frequency dividers configured to generate the sequence of constellation points based upon the low frequency digital clock signal.

6. The receiver circuit of claim 5, wherein the SSB signal generator comprises:
    a divide-by-two frequency divider configured to divide the low frequency digital clock signal by two to generate a divided-by-two clock signal; and
    a Johnson counter configured to receive the divided-by-two clock signal and to generate the in-phase and the quadrature phase signal components therefrom.

7. The receiver circuit of claim 2, wherein the sequence of constellation points comprise a first sequence that corresponds to the SSB test signal having a positive frequency single sideband or having a second sequence that corresponds to the SSB test signal having a negative frequency single sideband.

8. The receiver circuit of claim 1, further comprising:
a plurality of additional receiver paths, wherein respective additional receiver paths comprise an additional test signal injection point and an additional mixer located downstream of the additional test signal injection point; and
a distribution network comprising a symmetric power splitter configured to supply the SSB test signal to the test signal injection points of respective additional receiver paths;
wherein the additional mixers are configured to mix the SSB test signal with the local oscillator signal to generate down-converted output signals indicative of errors in the additional receiver paths.

9. The receiver circuit of claim 8, wherein the symmetric power splitter is configured to provide the SSB test signal having a substantially equal phase to all reception paths so that a comparison between the down-converted output signals of each reception path can be made, to generate information of phase drift between reception paths.

10. The receiver circuit of claim 8, wherein the receiver circuit is comprised within a digital beamforming radar.

11. The receiver circuit of claim 1, wherein the test signal generation component, the test signal injection point, and the mixer are comprised within a single integrated chip.

12. A circuit, comprising:
a single sideband (SSB) signal generator having a digital clock input configured to receive a low frequency digital clock signal, wherein the SSB signal generator is configured to generate in-phase and quadrature phase signal components of a baseband IQ signal, comprising a sequence of constellation points, from the low frequency digital clock signal;
first and second magnitude setting blocks located downstream of the SSB signal generator and respectively configured to selectively vary a magnitude of the in-phase signal component based upon a first amplitude setting word and to vary a magnitude of the quadrature phase signal component based upon a second amplitude setting word;
an IQ modulator configured to modulate the baseband IQ signal onto a local oscillator signal to generate a single sideband (SSB) test signal;
one or more reception paths coupled to an antenna and respectively configured to receive one or more RF signals;
one or more couplers in direct communication with the one or more reception paths and configured to provide the SSB test signal to the one or more reception paths; and
one or more mixers respectively disposed within the one or more reception paths at a location downstream of the one or more couplers, the one or more mixers configured to mix the SSB test signal with the local oscillator signal to generate one or more output signals indicative of an error in the reception paths.

13. The circuit of claim 12, wherein the sequence of constellation points traverse 360° in an I/O plane in a clockwise or a counter clock-wise direction.

14. The circuit of claim 12, wherein the SSB test signal is generated independent from the one or more RF signals received by the one or more reception paths.

15. A method for testing one or more reception paths of a receiver circuit, comprising:
generating a single sideband (SSB) test signal independent from an RF signal received by the receiver circuit, wherein generating the SSB test signal comprises:
generating an IQ baseband signal having an in-phase component and a quadrature phase component;
selectively adjusting an amplitude of the IQ baseband signal, prior to modulation onto a local oscillator signal, by adjusting an amplitude of the in-phase component or the quadrature phase component using one or more amplitude setting words; and
modulating the IQ baseband signal onto the local oscillator signal to generate the SSB test signal,
injecting the SSB test signal into a reception path configured to receive the RF signal; and
down-converting the SSB test signal using the local oscillator signal to generate an output signal indicative of an error in the one or more reception paths.

16. The method of claim 15, wherein
the IQ baseband signal comprising a sequence of constellation points by division of a digital clock signal by one or more frequency dividers.

17. The method of claim 16, wherein the sequence of constellation points spans 360° in an I/O plane.

* * * * *